Figure 1:
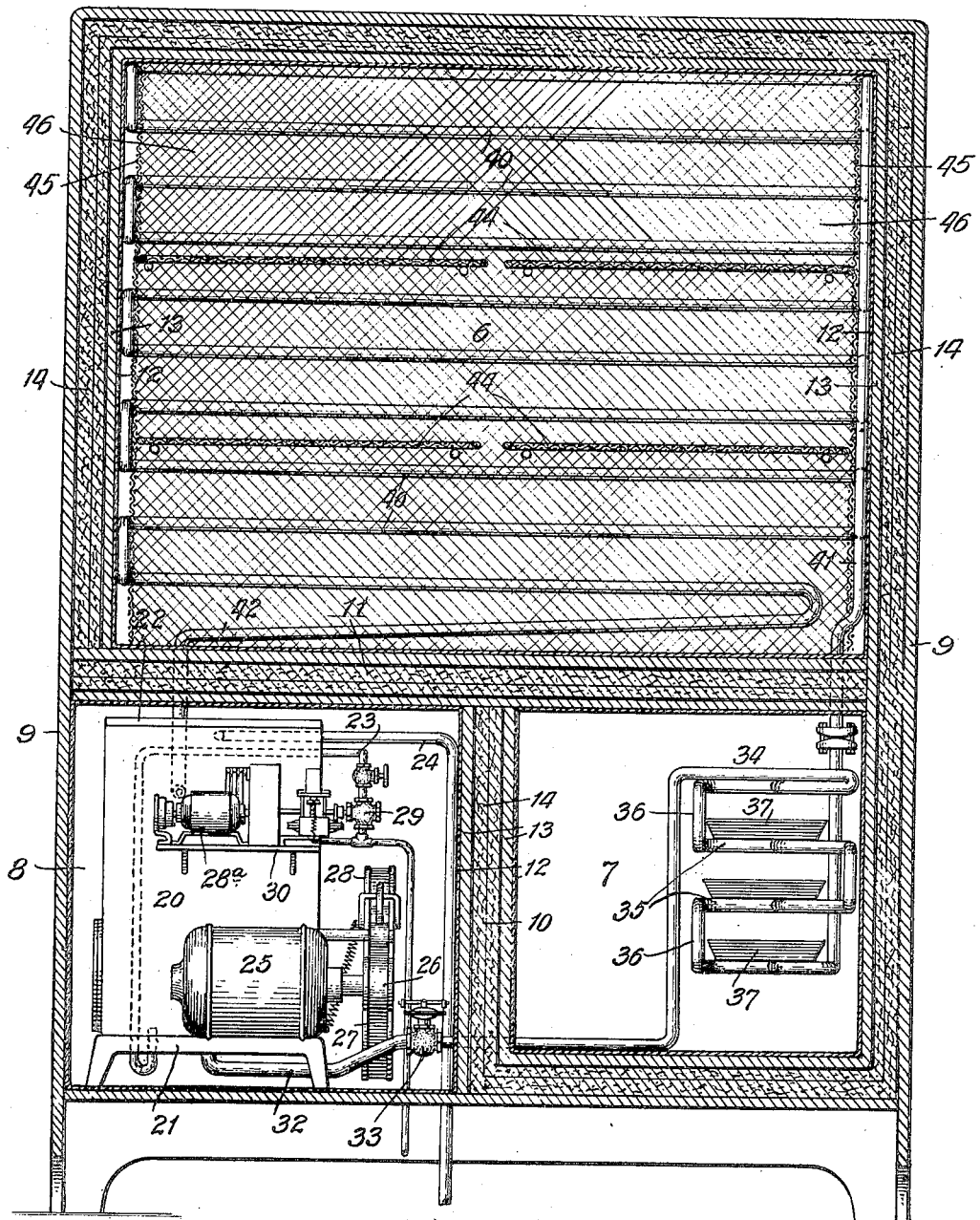

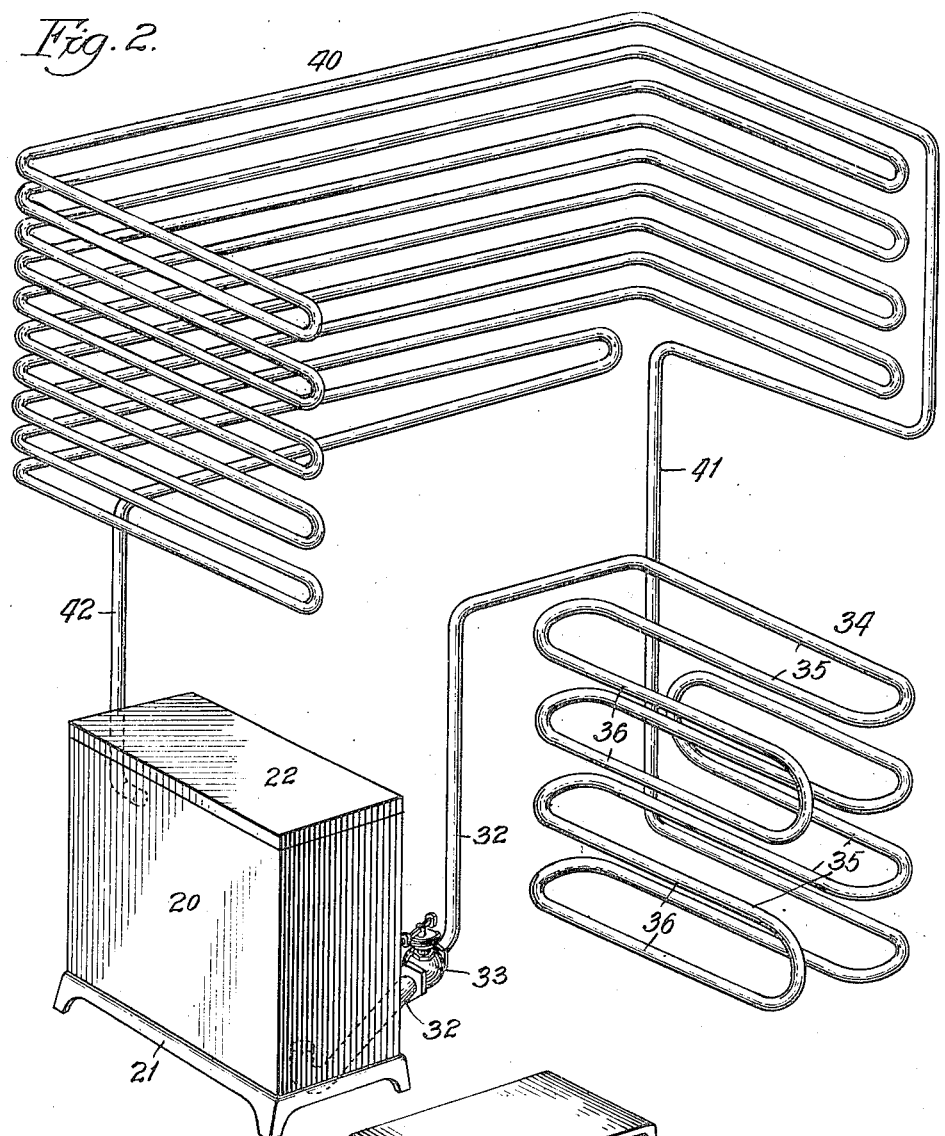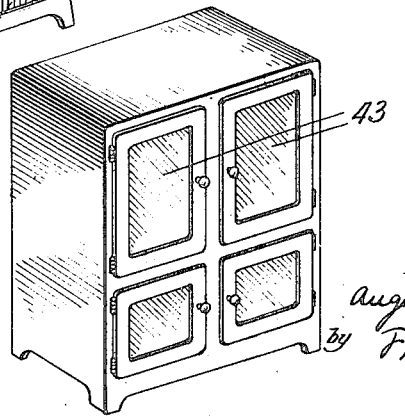

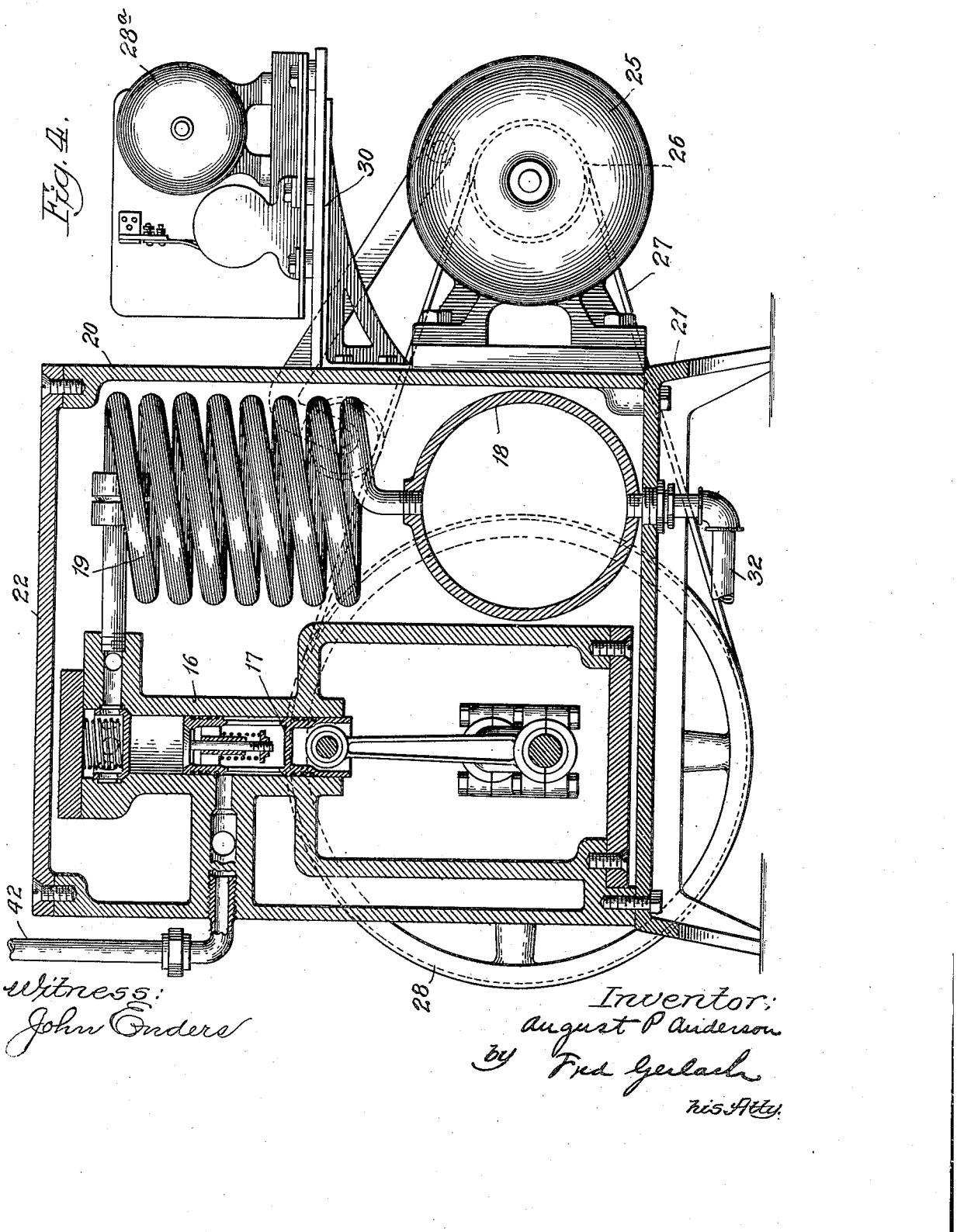

Patented Dec. 19, 1922.

1,439,051

UNITED STATES PATENT OFFICE.

AUGUST P. ANDERSON, OF CHICAGO, ILLINOIS, ASSIGNOR TO ANDERSON-REES REFRIGERATING MACHINE CO., OF CHICAGO, ILLINOIS, A CORPORATION OF ILLINOIS.

REFRIGERATING APPARATUS.

Application filed January 22, 1918. Serial No. 213,134.

*To all whom it may concern:*

Be it known that I, AUGUST P. ANDERSON, a citizen of the United States, and a resident of Chicago, in the county of Cook and State of Illinois, have invented certain new and useful Improvements in Refrigerating Apparatus, of which the following is a full, clear, and exact description.

The invention relates to refrigerating apparatus and more particularly to that type in which substantially the entire refrigerating apparatus, except the circulating line, is enclosed within the walls of a structure which contains the refrigerating chamber and a freezer. The object of the invention is to provide a refrigerating apparatus in which the refrigerating chamber, compressor and associated mechanism and the freezer and circulating coils are all contained within the walls of a structure or one which may be regarded as self-contained. A further object of the invention is to provide an improved construction and arrangement of refrigerating line which is more particularly adapted for use in a refrigerator.

The invention consists in the several novel features hereinafter set forth and more particularly defined by claims at the conclusion hereof.

In the drawings: Fig. 1 is a front elevation of a refrigerator embodying the invention, the walls being shown in section. Fig. 2 is a diagrammatic perspective of the refrigerating apparatus and circulating line. Fig. 3 is a perspective of the improved refrigerator. Fig. 4 is a view, partly in section and partly in elevation of the compressor and operating mechanism.

The invention is shown as applied to a refrigerator which is suitably divided into a refrigerating chamber 6, a freezing chamber 7 and a chamber 8 which is adapted to contain the operating and controlling mechanism. The outer wall 9, usually of wood, extends around the bottom, sides and top of the refrigerator. A wall 10 forms a partition between the freezing chamber 7 and the chamber 8. A horizontal wall 11 forms the top of the chambers 7 and 8 and the bottom of the refrigerating chamber 6. The side and top walls of the refrigerating chamber, partitions 10 and 11 and the outer side and bottom of chamber 7 each comprise a metal inner lining 12, an inner lining 13 of wood and a filling 14 consisting of insulating material, such as paper, and cork. The partition 10 and that portion of the wall 11 which is disposed above the chamber 8 are thus formed to insulate the chamber 8 from the freezing chamber 10 and the refrigerating chamber 6, so that the low temperature of said chambers will not be conducted to the chamber 8 which contains the operating mechanism. As a result of this construction and arrangement, the chamber 8 for the operating mechanism is enclosed within the surrounding walls of the structure and in a compartment within said walls, but the latter is insulated from the refrigerating chamber.

The refrigerating apparatus comprises a compressor, cylinders 16, a piston 17 working therein, a refrigerant receiver 18, and a condensor 19, all of which are located within a case formed by a jacket 20 which is mounted on a base 21 and is closed by a top plate 22. The compressor, condensor and receiver are connected together as well understood in the art, so that the refrigerant will be forced from the compressor through the condensor and into the receiver. The case containing the compressor, condensor and receiver is adapted for circulation therethrough of cooling liquid, the latter being delivered to the case by a pipe 23. An overflow pipe 24 conducts this liquid from the case.

An electric motor 25 is mounted on the front of the jacket 20 and serves to drive the compressor by means of a pulley 26, a belt 27 and a pulley 28 on the crank shaft of the compressor. Suitable automatic controlling mechanism, as exemplified by a thermostat in the refrigerating chamber, suitable electrical connections and switches, and a motor 28[a] for operating said switches and for operating a water valve 29, is mounted upon a bracket 30 which is secured to the front of jacket 20. The water valve 29 serves to control the supply of cooling medium to the chamber in the body 20, so that said valve will control the supply of cooling liquid so long as the compressor is in operation. The details of this controlling mechanism form no part of the present invention, so that it has not been deemed necessary to describe it in detail.

The refrigerating line between the receiver 18 and the compressor comprises an outlet pipe 32, a reducing valve 33, a coil of pipe 34 which consists of horizontal loops 35 connected to one another by vertical loops 36. From the reducing valve 33, the line extends to the upper end of the coil 34. The horizontal runs of these loops serve to support freezing-trays 37. From the reducing valve, the refrigerant first passes to this coil 34, which serves as a sharp freezer and the temperature of this freezer is considerably lower than that in the refrigerating compartment, as the result of this connection and because the compartment containing the sharp freezer is insulated from the refrigerating compartment. In practice, it has been found that the greater the length of the coil 34, the lower the temperature attained in this freezing chamber.

The refrigerant line comprises a coil of pipe 40 disposed in the refrigerating compartment 6 and this coil comprises loops extending back and forth around the two sides and the back of the refrigerating compartment, the front being open to give access to the contents of this compartment. From the freezing coil 34, the refrigerant passes to the top member of coil 40 through a connecting pipe 41 and from the lowermost member of coil 40 the refrigerant passes to the compressor through a pipe 42. The front of the compartment 6 is closed by suitable doors 43. The front of compartment 7 is closed by a suitable door. Shelves 44 are supported in compartment 6 to hold articles in the refrigerating chamber. A removable guard of wire netting extends in front of the back member of the coil 40, as at 46, and inside of the side-members of said coil, as at 45, to prevent any food-vessel from being placed where dripping from the coil would fall into such vessel.

The invention exemplifies a refrigerator in which the refrigerating chamber and the chamber containing the operating mechanism are all contained within the walls of the refrigerator and in which the chambers are insulated from one another, so that the operating mechanism will not be affected by the temperature in the refrigerating chamber or vice versa; also one in which the refrigerator comprises, in connection with such a structure, a freezing compartment which is insulated from the refrigerating compartment and the compartment containing the operating mechanism. By disposing the operating mechanism in a compartment below the refrigerating compartment and at one side of the freezing compartment, the mechanism is readily accessible when it is necessary to give attention thereto. The invention also exemplifies an improved refrigerator which is self-contained in that it embodies the operating mechanism, the refrigerant line and the freezing coil within its enclosing walls.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a refrigerator, the combination of an enclosing structure, a compressor and operating mechanism including a motor within the structure, a refrigerant coil within the structure, a freezing coil within the structure and between the high side of the compressor and the refrigerant coil, and means for preventing heat transference between the spaces containing the operating mechanism, the freezing coil and the refrigerant coil.

2. In a refrigerator, the combination of an enclosing structure, insulated means dividing the structure into a freezing compartment, a refrigerating compartment, and a compartment for operating mechanism, operating mechanism in the latter compartment, a freezing coil connected to the operating mechanism, in the freezing compartment, and a refrigerating coil in the refrigerating compartment connected to the freezing coil and to the operating mechanism.

3. In a refrigerator, the combination of an enclosing structure, insulated partitions dividing the structure into a freezing compartment at one side, a refrigerating compartment at the top, and a compartment at one side of the freezing compartment for operating mechanism, operating mechanism in the latter compartment, a freezing coil connected to the operating mechanism, in the freezing compartment, and a refrigerating coil in the refrigerating compartment connected to the freezing coil and to the operating mechanism.

AUGUST P. ANDERSON.